United States Patent Office 2,965,050
Patented Dec. 20, 1960

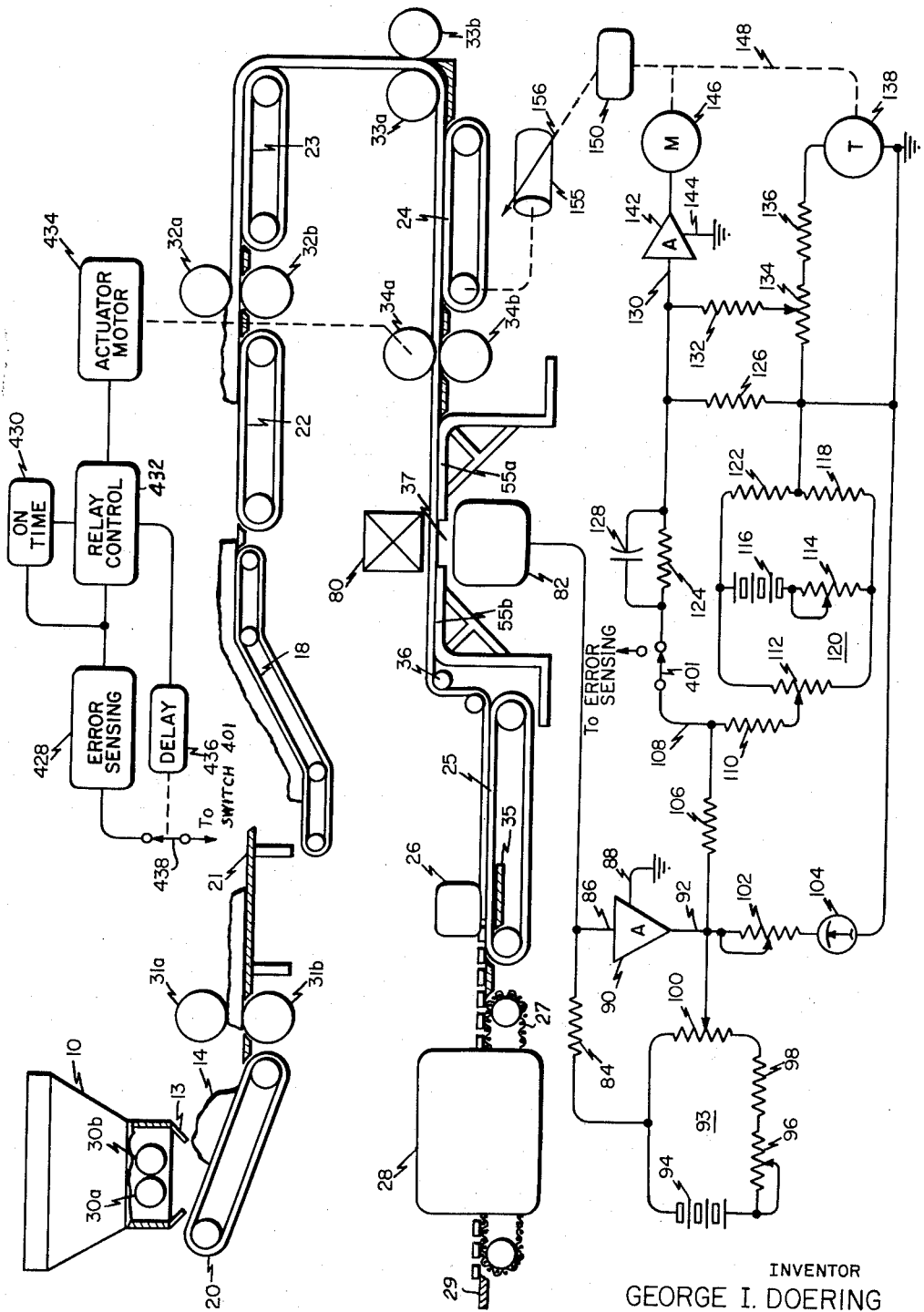

2,965,050

MEASUREMENT AND CONTROLLING SYSTEM FOR A DOUGH MACHINE

George I. Doering, Middletown, Ohio, assignor to Industrial Nucleonics Corporation Filed Feb. 20, 1957, Ser. No. 641,397

10 Claims. (Cl. 107—69)

This invention relates generally to dough machinery, and more particularly to a unique system for controlling dough machinery to produce pieces of dough of uniform weight.

In the dough making art although the temperature and humidity of the proof room, where fermentation of the dough takes place, are partially controlled, other fermentation factors cause the dough of each trough to have different characteristics. It is known that there are different strains and strengths of bacteria which will give different fermentation characteristics and for the same given set of conditions what seem to be similar bacteria do not produce similar results.

The amount of fermentation of the dough controls its elasticity, acidity and sugar content. The elasticity of the dough in cases of over-fermentation may cause the dough to be crumbably and have little cohesion (flat or slack); the acidity of the dough affects the taste and color of the finished cracker; and the amount of sugar present in the dough determines the brownness of the baked products. Dough condition, which is deflected in its thickness after it is rolled, in general then affects texture, flakiness, and blister size of the finished cracker which not only affects the physical appearance of the product but also its palatability.

The objective in dough fermentation, therefore, would appear to be to stop the fermentation process for each batch of dough at a given point which will result in the most desirable characteristics. However, because of the necessity of continuous production and production scheduling the time of fermentation remains fixed and control of other factors is attempted by the manufacturers.

The present invention overcomes most of the above-noted disadvantages of accurately measuring and controlling the thickness and weight of the ribbon of dough prior to its being cut into units. This is accomplished in a typical system by measuring the thickness of the ribbon of dough with a radiation detector and transmitting the weight variations in terms of voltages to control the speed of the aprons feeding the dough to the finishing rolls or to automatically control the screwdown of the finishing rollers.

It is accordingly an object of the present invention to provide a new and improved dough machine.

It is a further object of the present invention to provide a new and improved dough machine for producing units having the desirable characteristics.

Another object of the present invention is to provide a new and improved dough machine for producing units having a uniform weight as well as uniform size.

Another object of the present invention is to provide apparatus for measuring the weight variation in a continuous ribbon of dough and to utilize the weight variations to control the thickness of the ribbon.

Still another object of the present invention is to provide apparatus for measuring and controlling the thickness or weight of a ribbon of dough that is simple in design, requiring a minimum number of components and that may readily and inexpensively be adapted to a conventional dough sheeting process.

Further objects and attainments of the present invention will become readily apparent upon a careful consideration of the following detailed description when taken in conjunction with the accompanying drawing in which the single view illustrates a typical dough sheeting process together with a schematic circuit diagram partly in block of the measuring and controlling system of the present invention.

It is to be understood that the present invention, although described hereinafter in conjunction with a soda cracker machine, is also adaptable to a machine for producing biscuits, cookies, buns, rolls and any other dough product made from a ribbon.

Generally in a typical process of preparing dough, the basic ingredients—sugar, flour, water, yeast and soda—are mixed in a trough that is placed in the proof room for fermentation. After a certain number of hours of fermentation a sample is removed from the trough and an acidity test is made to determine the strength of acid present and accordingly the amount of base necessary for neutralization. Soda, generally used as an acid neutralizer, is mixed into the fermented dough and the trough is again placed in the proof room for a few more hours. After complete neutralization of all acids present, the dough is then ready for the sheeting, cutting and baking operations typically illustrated in the single view of the accompanying drawing.

In the operation of the machine, the dough is dumped in the hopper 10 and metered out by motor driven rollers 30a and 30b into a form 14 which may weigh 250 to 300 pounds. This form 14 slides down a chute 13 to the belt 20 where it is fed through a set of rolls 31a and 31b called break rolls. As the dough passes through the break rolls 31a and 31b it is manually folded and rolled on table 21 into a form approximately 4' x 4' square. This form is then rotated 90° and again fed through the same break rol's 31a and 31b. The dough may again be folded and rolled, depending on its cohesion, but usually it is rolled only twice. After the final rolling, this dough is conveyed by means of a motor driven (drive not shown) canvas belt 18 to the first work rolls 32a and 32b. At this point a typical form is about 4' wide, 20' long, and 1" thick.

Just before the first work rolls is another traveling canvas belt 22 (called an apron) which is generally traveling at the speed of the circumference of the first work rolls 32a and 32b, but which may be adjusted independently (slightly faster or slower) so as to control the rate at which dough enters the rollers 32a and 32b. The dough is fed onto the first work roll apron 22 from belt 18 where it is "lapped" onto the end of the preceeding form. The dough then passes through the first work rolls 32a and 32b.

After emerging from rollers 32a and 32b the dough 14 is fed onto the second work roll apron 23 whose speed relationship is the same with the second work rolls 33a and 33b as that of the first apron 22 with respect to the first work rolls 32a and 32b. The dough is now approximately 4' wide and ⅝" thick. It is thus fed into the second work rol's 33a and 33b.

From the second work rolls 33a and 33b the dough strip 14—now 4' x ⅜"—is fed onto the finish roll apron 24 and then into the finish rolls 34a and 34b or third work rolls. The machine drive is so designed that all three aprons 22, 23, and 24 and the work rolls, 32a, 32b, and 33a and 33b may be speed controlled as a unit, with each capable of being individua'ly varied by small amounts. The third work rolls 34a and 34b, or finish rolls, are normally connected (connections not shown)

to the drive of the apron 25 following it and are independent of the preceding speed controls.

As the dough 14 leaves the finishing rolls 34a and 34b it passes over supports 55a and 55b onto the cutting apron 25. Here it is brushed to eliminate excess flour and crumbs and is then stamped with cracker patterns by the cutter 26. The cutter 26 stamps a set number of cracker imprints per stand and its stamping operation is done directly on the cutting apron 25 which has a metal plate 35 backing the cutter area. The cutter is continuously in motion and its travel is synchronized with the apron speed to permit cutting and lifting and reversing for the next cut without leaving unstamped pieces of dough. Reference may be had to U.S. Letters Patent No. 2,770,203, issued November 13, 1956, to H. G. Ooms for a more detailed description of cutter 26.

After the cutter 26, the dough leaves the canvas apron and is transferred onto a metal mesh belt 27 which passes through the oven 28. As the crackers emerge from the oven 28 they pass onto a table 29 and are then broken into squares for cooling and packaging.

As previously pointed out, the primary purpose of the present invention is to measure and control the thickness or weight of the ribbon of dough prior to its being cut into units. The preferred embodiment shown in the drawing accomplishes this purpose by providing a source of radiation 80 disposed on one side of the dough after it leaves the finishing rolls 34a and 34b and a radiation detector 82 on the opposite side of the dough. Source 80 may in the embodiment shown be strontium 90; however, when the principles of the present invention are applied to a product of heavier weight, such as refrigerated biscuits, a source of bremsstrahlung radiation such as disclosed in the patent to G. Foster et al., No. 2,933,606, may be used. The detector 82 may be a Geiger counter or other suitable means according to the source employed and is activated by the emanations from source 80. It is herein noted that thickness and weight are related by $x = \rho h$, where $x$ is the mass per unit area of the ribbon, $\rho$ is the density of the ribbon and $h$ is the thickness. The term weight as herein used is construed to be the mass per unit area of the ribbon. The disclosed measuring system is responsive to variations in this quantity in accordance with the well known principles of radiation absorption.

To provide a support for the dough, and yet to permit measurement, there are incorporated in the system metal support bars 55a and 55b.

In the illustrated embodiment these support bars are mounted to permit the ribbon of dough to pass with a minimum of friction from rollers 34a and 34b to support roll 36. These support bars 55a and 55b may be a pair as shown with a spacing therebetween or may be a table-like support with an aperture therein. In either instance the gap 37 in the support is provided to permit the radiation from source 80 to pass therethrough to the detector 82 positioned on the other side of the dough.

The signal received by the detector 82 is measured and the resulting signal variations, from a standard weight or setting, as explained hereinafter, are used to control the speed of variable speed apron 24 that feeds the finishing rolls 34a and 34b or the screw down on the rolls 34a and 34b. In either case, the basis weight of the ribbon emerging from the finishing rolls 34a and 34b will be altered according to the rate of dough feed relative to the spacing of the finishing rolls. In the preferred embodiment, one quantity is maintained constant and the other is adjusted in a manner described hereinafter. It has been found that an effective and accurate control of the dough weight could be had by controlling the speed of the feed apron 24 relative to the rollers 34a and 34b when the dough is consistent, either good or bad. However, where the dough varies to extremes, adjustment control of the finish rolls 34a and 34b has proven to be more satisfactory.

In operation of the measuring and controlling system of the present invention illustrated in the drawing, the electrical output signal developed by the detector 82 is a minute current which flows through a resistor 84 having a very high impedance. A voltage proportional to the current through the detector 82 is thereby developed across resistor 84, and this signal is utilized by the measuring system of the gauge to provide an indication of the weight of the ribbon of dough passing between the source 80 and the detector 82.

The measuring system comprises a feedback amplifier 90 with an input on line 86 and a ground reference 88; a calibrating and standardizing network indicated generally at 93, and the weight indicator 104. In operation the signal voltage developed across resistor 84 is compared with a fixed opposing voltage from the network 93, this latter voltage always being added algebraically to the signal voltage so that the amplifier responds to the difference. The output of the amplifier on line 92 is coupled back to the input 86 through the network 93 and resistor 84, so as to maintain the amplifier input at substantially zero or ground potential at all times. Thus the amplifier output voltage between line 92 and ground is automatically maintained equal to the algebraic difference between the voltage developed across resistor 84 and the fixed voltage from the network 93. The amplifier 90 therefore performs an impedance matching functioning in transforming a high impedance signal into a robust signal for operating the controller and the indicating meter 104, and this is accomplished without appreciable distortion of the signal, through the agency of the substantially total inverse feedback arrangement. The indicator 104 is responsive to any output voltage from the amplifier 90, and its pointer will be deflected to either side of its zero center position depending on the polarity of this output.

It can be seen that the calibrating potentiometer 100 provides an adjustment whereby the zero center position of the indicator 104 can be made to correspond to any selected value of dough thickness which it is desired to place at the center of the scale associated with the indicator 104. Potentiometer 102 is provided to allow an adjustment of the span of weight deviations, on each side of the center value, which are readable on the indicator scale. Thus the indicator scale may be calibrated directly in any desired units of weight per unit length such as would be representative of points, 100 points being the equivalent expression of an ounce in the cracker industry. Potentiometer 96 and resistor 98 determine the portion of the voltage from the voltage source 94 which is available across potentiometer 100 to provide the opposing voltage in the measuring system. Potentiometer 96 is therefore the means of standardizing the gauge so that the total voltage available across potentiometer 100 may be restored at any time to the exact value of the maximum voltage across resistor 84 when no dough is interposed between the source 80 and the detector 82.

The voltage output of the amplifier 90 which appears on line 92 is indicative of the weight of the ribbon of dough passing between the source 80 and the detector 82. This signal, which energized the weight indicator 104, is compared with another voltage representative of a desired weight of said ribbon. The difference of these voltages comprises an error signal which is coupled to an automatic controller. The network 120 provides a voltage signal representative of the desired weight of the dough. This voltage is continuously subtracted from the voltage signal representing the measured weight of the dough, so that the difference voltage appearing on line 108 at the junction of resistors 106 and 110 is a signal representing the direction and magnitude of the error in the measured weight of the dough.

The selected weight of the dough which is desired to be maintained constant by the automatic controller may be preset by means of potentiometer 112 in the network 120, that is, the setting of this potentiometer determines the direction and magnitude of the comparison voltage representing the desired weight. The bridge circuit 120, comprising potentiometer 112 and a pair of identical precision resistors 118 and 122, is energized by a voltage source represented by the battery 116. The voltage available across the bridge is adjustable by means of potentiometer 114. The potentiometer 112 may therefore be equipped with a graduated dial and calibrated directly in any desired units of weight per unit length to agree with the scale of the weight indicator 104. This provides a direct reading indication of the setting of the control point, independent of the calibration of the weight indicator 104.

The error signal appearing on line 108 may be passed through a lead network comprising resistors 124 and 126 and capacitor 128, whose function will become more apparent after the servo-system has been described. In the system wherein it is desired, as described above, to control the speed of the apron 24 feeding the final rollers 34a and 34b a continuous type of correction voltage is provided as follows. The error signal on line 108 provides an input voltage to the servo amplifier 142 which is grounded at 144 and energizes the servo motor 146. The motor 146 drives the speed control adjustment shaft 156 of the variable ratio transmission 155 through reduction gears 150. The servo motor 146 also drives a tachometer generator 138 which develops a D.C. voltage having a polarity in accordance with its direction of rotation and a magnitude proportional to its speed. The tachometer output voltage appears across the voltage divider network of potentiometer 134 and resistor 136. Depending on the setting of potentiometer 134, a portion of the tachometer voltage is fed through resistor 132 to the input of the servo amplifier 142 in opposition to the error signal voltage.

The servo amplifier 142 is designed to have an almost infinite forward gain so as to saturate on a very small input signal. If the input voltage representing an error in measured dough weight has a certain polarity, the servo motor 146 will be driven with full acceleration in one direction. If the error voltage has the opposite polarity, the motor will accelerate in the opposite direction. The motor will continue to accelerate until the voltage derived from the tachometer becomes equal and opposite to the error signal, at which time the input to the servo amplifier on line 130 is reduced to zero. At any greater speed the tachometer output through resistor 132 would become larger than the error signal, so that the input to the servo amplifier 142 would have the opposite polarity, tending to energize the servo amplifier 142 to drive in the opposite direction. It can be seen that by this means the speed of the servo motor 146 and the rate of readjustment of the speed of the variable feed apron 24 relative the finish rolls 34a and 34b is maintained instantaneously proportional to the magnitude and direction of the error in the measured weight of the dough. Therefore, over any given period of time, the total amount of adjustment applied to the control shaft 156 is proportional to the time integral of the error signal received over the same period of time. Thus, with a given spacing of the finishing rolls 34a and 34b, variations in dough feed thereto will cause corresponding changes in the density of the rolled ribbon, thereby altering its basis weight.

The rate of correction to the control shaft 156 per unit of error in measured dough weight is referred to as the "gain" of the control system. The gain of the system is dependent on the ratio selected for the speed reduction gears 150. The gain is variable over a suitable range by adjusting potentiometer 134, which determines the portion of the tachometer voltage which is fed back to cancel the error signal. Potentiometer 134 therefore determines the speed of the servo motor 146 which will be maintained for a given amount of error in dough weight.

The maximum permissible gain of the control system is definitely limited by transportation lag, that is, the length of time required for the effect of a step change in the setting of shaft 156 to be observed as a change in weight of the dough passing between the source 80 and the detector 82. If the gain is set too high, an existing error will be over-corrected before the gauge is able to "see" that sufficient correction has already been applied. Hence the drawing process is caused to "cycle" or perform forced oscillations around the desired dough weight. On the other hand, it is desirable to keep the gain as high as possible to secure optimum performance of the controller.

In addition to transportation lag, there are other types of delays in the system which can, however, be compensated for to a great extent. Examples of such delays are friction, mechanical inertia in the drive system or other controlled member, and electrical delays such as inductance in the field windings, etc., of a motor which is speed controlled. Such factors will prevent an instantaneous speed change of the controlled element in response to a change in the setting of the speed control shaft represented at 156. The method of compensating for these delays is to provide a momentary over-correction for any rapid change in the observed error, and a means of accomplishing this result is the provision of the lead network comprising resistors 124 and 126 and the capacitor 128. Where a constant error signal is present, the signal is divided by resistors 124 and 126. However, if there is a rapid change in the value of the error signal, the potential change is bypassed around resistor 124 through capacitor 128, so that a signal approaching the entire voltage appears momentarily across resistor 126 alone as an input to the servo system. As a result, it may be said that the controller momentarily observes and attempts to correct for a larger error that actually exists in the measured weight of the dough. The extra signal voltage may then decay according to the time constant of resistor 124 and capacity 128, so that the over-adjustment of the speed control effected by the presence of the lead network may be corrected when the error signal approaches a steady value.

As pointed out above there are circumstances wherein it is preferred to automatically adjust the screwdown on the finishing rolls 34a and 34b rather than the speed of the feed apron 24. In this instance the error signal from line 108 is fed by way of switch 401 to both an error sensing device 428 and an on time determining device 430.

The error sensing device may be a contact meter, polarized relay, or electronic switch which closes one electrical contact if the error is in the opposite direction. This sensitive relay system provides the power to operate the heavier relays in the relay control section 432 which in turn apply power to the actuator motor 434 to adjust the screwdown on the finish rolls 34a and 34b. In a typical arrangement, the upper roll 34a is vertically movable with respect to the lower roll 34b by mounting the axles of roll 34a in bearing blocks which are slidable in a frame member. Axles are connected to each bearing block and passed upwardly in threaded engagement with the frame member. The axles are in turn driven by the motor 434 through a suitable reduction gearing arrangement. Reference may be had to U.S. Letters Patent No. 2,684,001, issued July 20, 1954, to G. P. Wilson, for a more detailed disclosure of a roll screwdown apparatus.

In this case a reset system of control is used. That is, for each correction applied the actuator motor 434 operates for only a short interval of time determined by the on time circuit 430 so that the amount of each correction is proportional to the magnitude of error as measured by the gauge.

In the on time circuit, which may be a form of electronic timer, the error voltage may be depolarized in a rectifier bridge circuit having a unidirectional output voltage of a magnitude proportional to that of the error signal, irrespective of any polarity changes of the error signal. The output of the rectifier bridge may then be used to charge a capacitor whose negative terminal is connected to the grid of a thyratron relay control tube. When power is applied to the actuator motor 434 to start an adjustment of the screwdown, a resistance is connected across the capacitor through which the capacitor may be discharged to the point where the thyratron tube is able to fire, actuating a relay which causes the corrective action to cease. Since the initial voltage on the capacitor depends on the magnitude of the error signal, the time required for the voltage on the grid of the thyratron to be reduced to the firing point produces a correction time proportional to the error signal.

Inasmuch as the relay and timing circuits described so far in the single figure are of a type well known in the art, a more detailed description than the above is believed to be unnecessary.

Once a corrective adjustment has been made, a second correction is not permitted until the gauge is able to "see" the results of the first correction, which do not appear at the measuring head until the end of the transportation lag period. Accordingly, the delay device 436 is provided.

In the case where the thickness of the dough is relatively constant, the delay device 436 may be an electric reset timer which is initiated at the end of a corrective adjustment to the finish rolls. During its timing cycle, this timer may disconnect the output of the amplifier from the error sensing 428 and on time 430 circuits as by opening the switch 438, preventing further corrective action regardless of the presence of an error signal. The timer 436 is set to run for the duration of the transportation lag period. At the end of the timing period the control is reactivated when the timer recloses switch 438. The timer then automatically resets itself to await the end of the next correction.

Although only certain and specific embodiments of the present invention are shown, it is to be expressly understood that many modifications are possible thereof without departing from the true spirit of this invention.

What is claimed is:

1. In dough machinery for producing a ribbon of dough, apparatus for maintaining said ribbon of dough at a uniform weight comprising: weight responsive means including means for directing a beam of radiation into said ribbon of dough and means for quantitatively detecting radiation transmitted through said ribbon of dough to render an indication of the weight thereof, means for comparing said rendered indication with a desired weight indication to provide an error signal having a magnitude proportional to the difference therebetween, means for varying the weight of said ribbon of dough, means for actuating said weight varying means, means responsive to a predetermined value of said error signal for initiating operation of said actuating means, and means for terminating said operation after a time interval proportional to the magnitude of said error signal.

2. In dough machinery for producing a ribbon of dough, apparatus for maintaining said ribbon of dough at a uniform weight comprising: weight responsive means including means for directing a beam of radiation into said ribbon of dough and means for quantitatively detecting radiation transmitted through said ribbon of dough to render an indication of the weight thereof, means for comparing said rendered indication with a desired weight indication to provide an error signal having a magnitude proportional to the difference therebetween, means for varying the weight of said ribbon of dough, means for actuating said weight varying means, means responsive to a predetermined value of said error signal for initiating operation of said actuating means, means for teminating said operation after a time interval proportional to the magnitude of said error signal, and means energized upon termination of said actuator operation for disabling said actuator operation initiating means for the time required for a discrete portion of said ribbon to travel from said weight varying means to said weight responsive means.

3. Apparatus for producing a ribbon of dough of uniform weight from a batch of dough comprising at least a pair of rolls, means for feeding said batch of dough to said pair of rolls to provide said ribbon of dough, weight responsive means including means for directing a beam of radiation into said ribbon of dough issuing from said pair of rolls and means for quantitatively detecting radiation transmitted through said ribbon of dough to render an indication of the weight thereof, means for comparing said rendered indication with a desired weight indication to provide an electrical signal having a characteristic proportional to the difference therebetween, means for adjusting the spacing of said pair of rolls to vary the weight of said ribbon, motor means for actuating said adjusting means, means responsive to a predetermined value of said signal characteristic for initiating operation of said motor means, and means for terminating said motor operation after a time interval proportional to said signal characteristic.

4. In dough machinery for producing a ribbon of dough, apparatus for maintaining said ribbon of dough at a uniform weight comprising: weight responsive means including means for directing a beam of radiation into said ribbon of dough and means for quantitatively detecting radiation transmitted through said ribbon of dough to render an indication of the weight thereof, means for comparing said rendered indication with a desired weight indication to provide an electrical signal having a characteristic proportional to the difference therebetween, means to vary the weight of said ribbon, motor means for actuating said weight varying means, means responsive to a predetermined value of said signal characteristic for initiating operation of said motor means, means for terminating said motor operation after a time interval proportional to said signal characteristic, and means energized upon termination of said motor operation initiating means for disabling said motor operation initiating means for the time required for a discrete portion of said ribbon to travel from said weight varying means to said weight responsive means.

5. Apparatus for producing pieces of dough of uniform weight from a batch of dough comprising at least a pair of rolls, means for feeding said batch of dough to said pair of rolls to provide a ribbon of dough, a pair of spaced supports adjacent the exit side of said pair of rolls, weight responsive means including a source of radiation, a detector for said radiation, and means for positioning said source and detector about opposite sides of said ribbon in alignment with the spacing between said supports, means connected to said detector for rendering an indication of the weight of said ribbon, means for comparing said rendered indication with a desired weight indication to provide an elecrtical signal having a characteristic proportional to the difference therebetween, means for adjusting the spacing of said pair of rolls to vary the weight of said ribbon, motor means for actuating said adjusting means, means responsive to a predetermined value of said signal characteristic for initiating operation of said motor means, means for terminating said motor operation after a time interval proportional to said signal characteristic, means energized upon termination of said motor operation for disabling said motor operation initiating means for the time required for a discrete portion of said ribbon to travel from said pair of rolls to said weight responsive means, and cutter means positioned at the output end of said apparatus for dividing said ribbon of dough into pieces of equal length and width.

6. Apparatus for producing pieces of dough of uniform weight from a batch of dough comprising at least a pair of rolls, means for feeding said batch of dough to said pair of rolls to provide a ribbon of dough, a pair of spaced supports for said ribbon of dough, means for mounting said supports adjacent the exit side of said pair of rolls, weight responsive means including a source of radiation, a detector for said radiation, and means for positioning said source and detector about opposite sides of said ribbon in alignment with the spacing between said supports; measuring circuit means connected to said detector to provide a first electrical signal of a magnitude proportional to the weight of said ribbon, means for generating a second electrical signal of a magnitude proportional to a desired weight of said ribbon, means for combining said first and said second electrical signals to provide an error signal having a characteristic proportional to the difference therebetween, means for adjusting the spacing of said pair of rolls to vary the weight of said ribbon, motor means for actuating said adjusting means, means responsive to a predetermined value of said error signal characteristic for initiating operation of said motor means, means for terminating said motor operation after a time interval proportional to said error signal characteristic, and cutter means positioned at the output end of said apparatus for dividing said ribbon of dough into pieces of equal length and width.

7. Apparatus for producing a ribbon of dough of uniform weight from a batch of dough, comprising at least a pair of rolls, means for feeding said batch of dough to said pair of rolls to provide said ribbon of dough, weight responsive means including means for directing a beam of radiation into said ribbon of dough issuing from said pair of rolls and means for quantitatively detecting radiation transmitted through said ribbon of dough to render an indication of the weight thereof, means for comparing said rendered indication with a desired weight indication to provide an error signal having a characteristic proportional to the difference therebetween, adjustable means for varying the rate of feed of said ribbon of dough to said pair of rolls, means for adjusting the spacing of said pair of rolls, motor means for actuating said adjusting means, means responsive to a predetermined value of said error signal characteristic for initiating operation of said motor means, and means for terminating said motor operation after a time interval proportional to said signal characteristic.

8. Apparatus for producing a ribbon of dough of uniform weight from a batch of dough, comprising at least a pair of rolls, means for feeding said batch of dough to said pair of rolls to provide said ribbon of dough, weight responsive means including means for directing a beam of radiation into said ribbon of dough issuing from said pair of rolls and means for quantitatively detecting radiation transmitted through said ribbon of dough to render an indication of the weight thereof, means for comparing said rendered indication with a desired weight indication to provide an error signal having a characteristic proportional to the difference therebetween, adjustable means for varying the rate of feed of said ribbon of dough to said pair of rolls, means for adjusting the spacing of said pair of rolls, motor means for actuating said adjusting means, means responsive to a predetermnied value of said error signal characteristic for initiating operation of said motor means, means for terminating said motor operation after a time interval proportional to said signal characteristic, and means energized upon termination of said motor operation for disabling said motor operation initiating means for the time required for a discrete portion of said ribbon to travel from said last pair of said rolls to said weight responsive means.

9. Apparatus for producing pieces of dough of uniform weight from a batch of dough comprising a plurality of successive pairs of rolls, means for feeding said batch of dough to each of said pairs to provide a ribbon of dough, a pair of spaced supports for said ribbon of dough, means for mounting said supports adjacent the exit side of the last pair of said rolls, weight responsive means including a source of nuclear radiation, a radiation detector, and means for positioning said source and detector about opposite sides of said ribbon in alignment with said spacing between said supports, measuring circuit means connected to said detector to provide an electrical signal of a magnitude proportional to the weight of said ribbon, means for generating a second electrical signal of a magnitude proportional to a desired weight of said ribbon, means for combining said first and said second electrical signals to provide an error signal having a characteristic proportional to the difference in said electrical signal magnitudes, adjustable means for varying the spacing of said last pair of rolls to vary the weight of said ribbon issuing from said last pair of said rolls, motor means for actuating said adjustable means, means responsive to a predetermined value of said error signal characteristic for initiating said motor operation, means for terminating said motor operation after a time proportional to said error signal characteristic, and cutter means positioned at the output end of said apparatus for dividing said ribbon of dough into pieces of equal length and width.

10. Apparatus for producing pieces of dough of uniform weight and thickness from a batch of dough comprising a plurality of successive pairs of rolls, means for feeding said batch of dough to each of said pairs to provide a ribbon of dough, a pair of spaced supports for said ribbon of dough, means for mounting said supports adjacent the exit side of the last pair of said rolls, weight responsive means including a source of nuclear radiation, a radiation detector, and means for positioning said source and detector about opposite sides of said ribbon in alignment with said spacing between said supports, measuring circuit means connected to said detector to provide an electrical signal of a magnitude proportional to the weight of said ribbon, means for generating a second electrical signal of a magnitude proportional to a desired weight of said ribbon, means for combining said first and said second electrical signals to provide an error signal having a characteristic proportional to the difference in said electrical signal magnitudes, adjustable means for varying the rate of feed of said ribbon of dough to said last pair of said rolls, means for varying the spacing between said last pair of rolls to vary the thickness of said ribbon of dough, means for adjusting said feed varying means to a given spacing of said rolls to vary the weight of said ribbon issuing from said last pair of said rolls, motor means for actuating said spacing varying means, means responsive to a predetermined value of said error signal characteristic for initiating said motor operation, means for terminating said motor operation after a time proportional to said error signal characteristic, means energized upon termination of said motor operation for disabling said motor operation initiating means for the time required for a discrete portion of said ribbon to travel from said last pair of said rolls to said weight responsive means, and cutter means positioned at the output end of said apparatus for dividing said ribbon of dough into pieces of equal length and width.

References Cited in the file of this patent

UNITED STATES PATENTS

| 1,134,971 | Loose | Apr. 6, 1915 |
| 2,618,751 | Fearnside et al. | Nov. 18, 1952 |
| 2,655,118 | Whitehead et al. | Oct. 13, 1953 |
| 2,672,829 | Rice | Mar. 23, 1954 |
| 2,684,001 | Wilson | July 20, 1954 |
| 2,704,079 | Molins et al. | Mar. 15, 1955 |
| 2,707,923 | Hansen | May 10, 1955 |